UNITED STATES PATENT OFFICE.

JAMES DUNCAN, OF SELBY, ENGLAND.

METHOD OF TREATING MOLASSES TO IMPROVE ITS FLAVOR.

SPECIFICATION forming part of Letters Patent No. 455,295, dated June 30, 1891.

Application filed August 20, 1890. Serial No. 362,546. (No specimens.) Patented in England July 22, 1890, No. 11,473.

*To all whom it may concern:*

Be it known that I, JAMES DUNCAN, sugar-refiner, a subject of the Queen of Great Britain and Ireland, and residing at Rawcliffe Bridge, Selby, in the county of York, England, have invented certain Improvements in Methods of Treating Molasses or Sirup for the Purpose of Improving its Flavor, (for which I have obtained a patent in Great Britain, No. 11,473, dated July 22, 1890,) of which the following is a specification.

This invention has for its object the treatment, as hereinafter described, of molasses, sirups, or dissolved sugar for the purpose of improving their flavor.

Molasses or sirups, more especially the molasses or sirup of beet-root sugar, contain, as a rule, alkaline salts and other impurities which give them an objectionable flavor.
Among these salts the principal are the acetates, carbonates, chlorides, and nitrates of potassium and sodium. In order to remove this disagreeable flavor I first dilute the molasses or sirups to 10° Baumé or thereabout, and then add a quantity of sulphuric acid or sulphate of alumina, preferably the former, sufficient to displace, either partly or entirely, the volatile acids present. It is impossible to precisely indicate the quantity of sulphuric acid required to give the best results, as it will vary with the nature and amount of the impurities present. I find, however, that the proportion varies from one to six parts, by weight, of commercial sulphuric acid to one hundred parts, by weight, of sirups or molasses. The next step is to remove the volatile impurities which have been set free by the sulphuric acid, and this is effected by boiling and at the same time passing by any suitable means—such as a blower, air-compressor, injection-jet, or the like—a current of warm or cold air, carbonic-acid gas, or sulphurous-acid gas through the solution, which is heated by a steam-jacket or in any other known or suitable way. This treatment with currents of gas or vapor during the concentration of the solution facilitates and expedites the operation and promotes the removal of the volatile impurities. The liquid should be concentrated to 29° or 30° Baumé, the operation being conducted either in an open pan or *in vacuo*, as desired. The vapor given off in this operation will be found to contain acetic acid and other volatile impurities. The whole of the sulphuric acid may be added to the diluted molasses or sirups prior to the process of evaporation, or it may be added in successive installments during the process of concentration.

The principal chemical reactions which occur when the diluted sirup is acted upon by sulphuric acid are as follows:

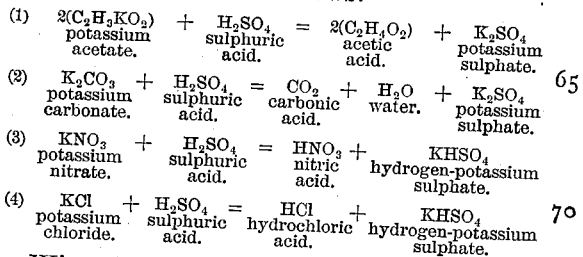

When it is found that all the volatile impurities that can be removed have passed off, the sirup is neutralized with lime, carbonate of lime, caustic soda, or carbonate of soda and filtered through Taylor filters or filter-presses or equivalent apparatus, and lastly evaporated in the usual way to a density of 43° Baumé or thereabout; or the sirup may be passed through animal charcoal to improve its color prior to its final concentration.

Having now particularly described and ascertained the nature of this invention, I declare that what I claim is—

The described process of treating molasses or sirups to purify and improve their flavor by first diluting them, then adding sulphuric acid to decompose the alkaline salts, boiling, and passing a current of air or other gas or vapor, as specified, through the liquid during the boiling operation, as and for the purpose set forth.

In testimony whereof I have signed my name to this specification in the presence of two subscribing witnesses.

JAMES DUNCAN.

Witnesses:
 FREDERICK R. HOLLOMAN,
 ROBERT JOHN SMYTH,
  *Both of Rawcliffe, Yorkshire.*